Figure 1:
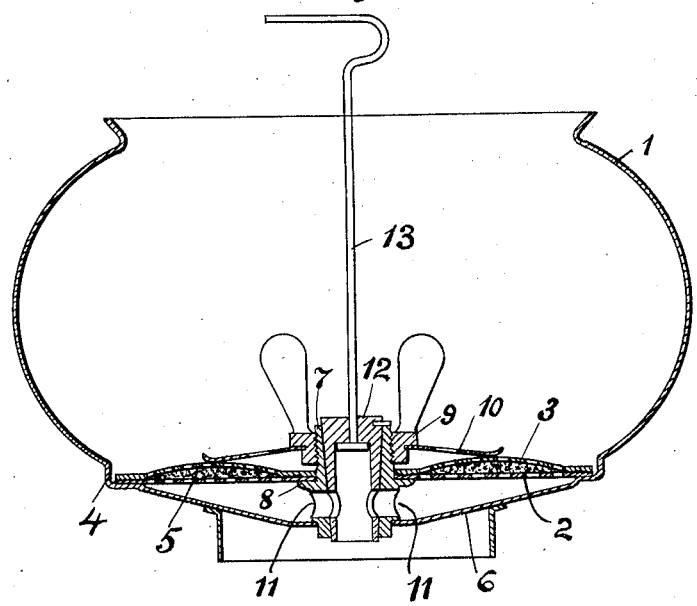

A. J. E. MUNTERS.
STRAINER.
APPLICATION FILED AUG. 1, 1918.

1,339,037.

Patented May 4, 1920.

INVENTOR:
A.J.E. MUNTERS
BY: 
ATTORNEY.

UNITED STATES PATENT OFFICE.

ANDERS JOHAN ERICSSON MUNTERS, OF STOCKHOLM, SWEDEN, ASSIGNOR TO AKTIEBOLAGET PUMP-SEPARATOR, OF STOCKHOLM, SWEDEN, A CORPORATION OF SWEDEN.

STRAINER.

1,339,037.         Specification of Letters Patent.     Patented May 4, 1920.

Application filed August 1, 1918. Serial No. 247,841.

*To all whom it may concern:*

Be it known that I, ANDERS JOHAN ERICSSON MUNTERS, a subject of the King of Sweden, and resident of Fleminggatan 57, Stockholm, in the Kingdom of Sweden, engineer, have invented certain new and useful Improvements in Strainers, of which the following is a specification, reference being had therein to the accompanying drawing.

For the straining of milk and other liquids strainers generally are used, in which the straining device is located at the lower part of a filling vessel, which generally can be placed directly into the neck of a milk-can or the like.

The said strainers have a drawback consisting in the impossibility of shutting off the same when the milk-can is filled, so that milk is spilled, while the strainer is moved from one can to another, or runs over the edge of the can, when there is a greater quantity of milk in the strainer than the can may hold. For the removing of the said disadvantages detached strainers are manufactured, which at their lower part or their side wall are provided with an ordinary cock or the like. The arrangement last mentioned, which may be considered comparatively satisfactory as to great quantities of milk, is however, unfit for such strainers, as are put directly on milk-cans, and would involve very great difficulties in the constructing of the same and unnecessary expenses.

The object of this invention is to remove the said difficulties and at a slight expense to manufacture perfectly hygienic straining devices for instance in milk-cans for cream-separators and in vessels, which are adapted to receive the milk or liquid and are located close to beams or other structures and not without great difficulties may be shut or opened (from below). The invention may advantageously be used in such an ordinary milk-can as is used at most separators, in which case a perfectly modern strainer is of very great importance, owing to the fact that the milk passes through the cotton filters located between the strainer disks and thus is perfectly cleaned, which facilitates the skimming operation of the separator.

Through the improvement in question is rendered superfluous the buying of an extra strainer for all such separators, as are provided with a milk-can suitable for the present strainer construction.

The invention is characterized chiefly by the fact, that below the strainer body a bottom wall is provided, having an opening substantially in the center of the same and a cock or any other suitable device for shutting off the said opening, which cock is accessible above the strainer vessel or strainer body.

Figure 2:
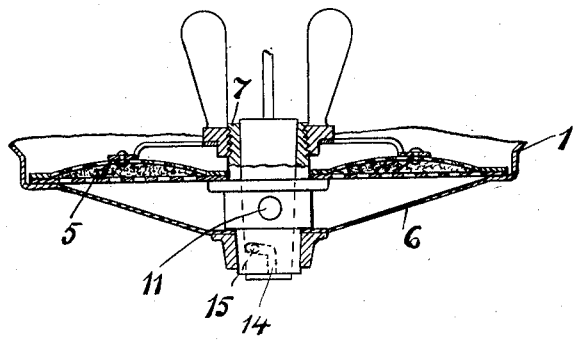

Figures 1 and 2 in the accompanying drawing show in vertical sections two forms of the invention. In both figures the strainer body is shown provided in the milk-can of a separator.

1, Fig. 1, is the milk-can of the ordinary construction used for separators. 2 is a lower perforated strainer disk and 3 an upper perforated strainer disk. The said disks are circular and adapted to be mounted into a circular recess 4 provided in the milk-can. Between the strainer disks 2, 3 a cotton layer 5 is located. In a bottom wall 6 located below the strainer disks 2, 3 a central opening is provided, in which the casing 7 of a cock is fixed for instance by soldering. The said casing 7 extends through openings in the disks 2, 3 and has a flange 8 supporting the center parts of the strainer disks. The top part of the casing 7 is provided with screw threads, which are engaged by a thumb nut 9. Between the said nut and the strainer disk 3 a washer 10 is located. By tightening the nut 9 the strainer disks are forced against one another and against the flange 8 and the wall of the milk-can. Below the disk 2 outlet openings 11 are provided in the casing 7. 12 is the plug of the cock provided with a handle 13, which extends above the edge of the milk-can 1.

The strainer operates in the following manner: The milk is charged into the can 1 in the ordinary manner. The plug 12 is then turned by means of the handle 13 into the open position. The milk now passes from the can 1 through the disks 3 and 2 and the cotton layer 5 and then through the openings 11 and the plug 12 to the separator. For the interrupting of the milk supply the plug is turned into the closing position. This is of importance especially as the straining device is used in other filling vessels, as no milk then may be spoiled. Instead of the cock any other shutting off device may evidently be used.

The device shown in Fig. 2 differs from that shown in Fig. 1 substantially by the fact, that the casing 7 of the cock is fixed to the bottom wall 6 of the can 1 in a detachable manner by means of an ordinary bayonet-clutch 14, 15, so that the strainer disks, the casing of the cock and the plug as a whole may be put into the can and removed from the same. Instead of the flange 8 of the casing 7, which serves as a support to the strainer disks, the edge of the central opening of the lower strainer disk or the edge of the opening in the bottom wall 6 may be extended downward and upward respectively and the extension adapted as a support for the disks, openings being provided in the extension for the passage of the milk.

Having now described my invention, what I claim as new and desire to secure by Letters Patent is:

1. In a strainer, the combination, with a strainer-body, of a bottom wall below the said body, a closing device located in an opening in said bottom wall, said closing device having a casing which tightens against the strainer-body, said casing being provided with an opening for communicating with a chamber between the strainer-body and the bottom wall, and a handle extending upward from the closing device for the operation of the same.

2. In a strainer, the combination with a strainer-body, of a bottom wall below the said body and having a cock located in an opening in the said bottom wall and having a plug, a handle extending upward from the plug of said cock, and a flange provided on the casing of the said cock and supporting the strainer-body.

3. In a strainer, the combination with a strainer-body of a bottom wall below the said body, a shoulder in the strainer-vessel for the said strainer-body, a cock located in an opening in the said bottom wall, a handle extending upward from the plug of said cock, a flange provided on the casing of said cock, a nut in screw-threaded engagement with the casing of the cock, and a washer provided between the said nut and the strainer-body for the forcing of the strainer body against the said flange and the said shoulder.

In witness whereof, I have hereunto signed my name.

ANDERS JOHAN ERICSSON MUNTERS.